(12) United States Patent
Lottes

(10) Patent No.: US 11,388,379 B2
(45) Date of Patent: Jul. 12, 2022

(54) MOTOR VEHICLE WITH DISPLAY DEVICE HAVING A PROJECTOR ON THE REAR SIDE OF A PROJECTION AREA

(71) Applicant: AUDI AG, Ingolstadt (DE)

(72) Inventor: Daniel Lottes, Ihrlerstein (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/650,609

(22) PCT Filed: Sep. 19, 2018

(86) PCT No.: PCT/EP2018/075383
§ 371 (c)(1),
(2) Date: Mar. 25, 2020

(87) PCT Pub. No.: WO2019/063388
PCT Pub. Date: Apr. 4, 2019

(65) Prior Publication Data
US 2021/0203898 A1 Jul. 1, 2021

(30) Foreign Application Priority Data
Sep. 26, 2017 (DE) ...................... 10 2017 217 023.9

(51) Int. Cl.
*H04N 7/18* (2006.01)
*H04N 9/31* (2006.01)
*B60K 37/02* (2006.01)
*G03B 21/58* (2014.01)

(52) U.S. Cl.
CPC ........... *H04N 9/3188* (2013.01); *B60K 37/02* (2013.01); *G03B 21/58* (2013.01); *B60K 2370/152* (2019.05); *B60K 2370/66* (2019.05)

(58) Field of Classification Search
CPC ........ H04N 7/18; H04N 9/3188; B60K 37/02; B60K 2370/152; B60K 2370/66; G03B 21/58
USPC .................................................. 348/148, 744
See application file for complete search history.

(56) References Cited

U.S. PATENT DOCUMENTS

| 5,343,257 A | 8/1994 | Kohno et al. |
| 5,523,880 A | 6/1996 | Pidgeon et al. |
| 5,526,066 A | 6/1996 | Kikuchi |
| 9,096,130 B2 * | 8/2015 | Pechnyk ................ B60K 35/00 |
| 10,705,334 B2 * | 7/2020 | Kasazumi .............. B60K 35/00 |
| 2002/0171637 A1 | 11/2002 | Kadowaki et al. |
| 2005/0046755 A1 | 3/2005 | Hattori et al. |

(Continued)

FOREIGN PATENT DOCUMENTS

| DE | 297 03 659 U1 | 6/1997 |
| DE | 202 10 601 U1 | 12/2003 |

(Continued)

OTHER PUBLICATIONS

WIPO Translation of International Preliminary Report on Patentability for PCT/EP2018/075383, dated Mar. 26, 2020, 7 pp.

(Continued)

*Primary Examiner* — Trang U Tran
(74) *Attorney, Agent, or Firm* — Staas & Halsey LLP

(57) ABSTRACT

Information that can be seen from the front side is projected onto the rear side of a projection area by a projector in a motor vehicle. The size of the projection area is variable by moving portions of a screen.

4 Claims, 3 Drawing Sheets

(56) References Cited

U.S. PATENT DOCUMENTS

| | | | | |
|---|---|---|---|---|
| 2010/0188204 | A1* | 7/2010 | Okada | B60K 35/00 340/457.1 |
| 2017/0103735 | A1* | 4/2017 | Oh | G06F 1/1601 |
| 2017/0158146 | A1 | 6/2017 | Livingston | |

FOREIGN PATENT DOCUMENTS

| | | |
|---|---|---|
| DE | 10 2005 020 260 A1 | 4/2006 |
| DE | 10 2005 034 088 A1 | 2/2007 |
| DE | 11 2008 002 093 T5 | 7/2010 |
| DE | 11 2008 002 093 B4 | 6/2016 |
| EP | 1 517 549 A2 | 3/2005 |
| EP | 1 637 387 A1 | 3/2006 |
| EP | 2 520 453 A1 | 11/2012 |

OTHER PUBLICATIONS

International Search Report for PCT/EP2018/075383 dated Dec. 20, 2018.
German Office Action for Application No. 10 2017 217 023.9 dated May 17, 2018.
DE102017217023.9, Sep. 26, 2017, Daniel Lottes, AUDI AG.
PCT/EP2018/075383, Sep. 19, 2018, Daniel Lottes, AUDI AG.

* cited by examiner

MOTOR VEHICLE WITH DISPLAY DEVICE HAVING A PROJECTOR ON THE REAR SIDE OF A PROJECTION AREA

CROSS REFERENCE TO RELATED APPLICATIONS

This application is the U.S. national stage of International Application No. PCT/EP2018/075383, filed Sep. 19, 2018, and claims the benefit thereof. The International Application claims the benefit of German Application No. 10 2017 217 023.9 filed on Sep. 26, 2017, both applications are incorporated by reference herein in their entirety.

BACKGROUND

Described herein is a motor vehicle with at least one display device.

Motor vehicles usually have at least one display device in the form of a display, which may also be designed as a touch display. This display is usually installed in the region of the central console or in the upper region of the dashboard, either in a fixed or lowerable state. These display devices or displays are in each case installed in a housing or, in the case of fixed installation in the region of the central console, are integrated there in corresponding housing-like mountings or the like.

The display devices are usually LCD displays, on which the required items of information are reproduced on the defined display area, which, depending on the software controlling the representation, may also be correspondingly partitioned.

In future, piloted driving, in which the vehicle is driven largely or completely autonomously, will increasingly gain ground. The driver is in this case relieved and can devote himself to other things. At the same time, there is the possibility that the driver will move his seat back into a position further away from the steering wheel or the dashboard, in which he sits more comfortably and with more space, so that he can attend to other activities. He may therefore assume a kind of rest position. Since, however, in this position he is further away from the display device, the representations on the display device or the display are more poorly perceivable for him.

SUMMARY

A motor vehicle includes a display device having a projector and a projection area, on the rear side of which the projector projects the representation of information that can be seen from the front side, the size of the projection area being variable.

A back-projection device, used as the display device, includes a projector, which illuminates a projection area from the rear side, that is to say that the representation of information visible from the front side is projected onto the rear side of the projection area, which of course is correspondingly translucent or transparent. This projection area is not fixed in size, but rather is variable in size. This makes it possible to be able to vary the representation of an image or information in its size, depending on where the driver or the driver's seat is actually located. If for example the driver is driving the car himself, that is to say he is in the usual driver's position, the size of the projection area is therefore set for this case; it is designed in such a way that the driver, who is sitting relatively close to it, can make out all of the items of information well. If, however, the driver or the driver's seat is in the rest position, further away from the projection area, the size of the projection area is increased correspondingly, so that altogether the representation projected is larger, and consequently the items of information can be made out in a correspondingly good way by the driver even when sitting further away from it.

According to a first alternative, the distance of the projection area from the projector may in this case be variable. According to this configuration, the axial distance between the projector and the projection area is accordingly varied for changing the size. That is to say that the projection area is closer to the projector when the driver or the driver's seat is closer to the projection area during active driving of the motor vehicle by the driver. By contrast, the projection area is moved axially away from the projector when the driver or the driver's seat is in the rest position. On account of the aperture angle of the projector, which can be chosen as relatively large, a correspondingly short axial movement of the projection area can be sufficient to increase the size of the representation of the information correspondingly.

The projection area may be a flexible area, that is to say a kind of screen onto which the representation of information is projected. This flexible projection area is expediently able to be partially wound up and unwound on one or two rollers or rolls, in order to vary the size. The one or the two rollers or rolls are correspondingly linearly movable, so that by winding up and unwinding the projection area they can be correspondingly moved away from or toward the projector. Two rollers or rolls on which the screen-like flexible projection area can be wound up and unwound may be used in this case. These two rollers or rolls are movable on corresponding linear guides, which run obliquely in relation to the axial movement axis, so that, as a result of the linear movement, their distance is increased or reduced during the movement. When there is an increase in the distance, the screen-like projection area is unwound from the rollers to increase the size of the projection area; when there is a reduction in the distance of the rollers, the opposite correspondingly applies. If only one roller or roll is provided, the other end of the projection area is correspondingly fixed in position, but equally guided linearly movably, in order to ensure that the plane of the projection area remains the same, and consequently therefore the projection area is not tilted in relation to the projector.

It is expedient in this case if, in a first position, in which it is partially wound up, the projection area is within a housing-like enclosure and, in a second position, in which it is unwound further or completely, it is moved out from the enclosure. If the projection area is for example installed in the region of the central console, the central console can as it were represent the housing-like enclosure. The projection area or screen may thus be moved axially in relation to this enclosure, that is to say the central console, and be adjusted between two positions, one position lying as it were within the enclosure or central console and the other position lying just outside it.

For varying the distance, it is expedient if the one or two rollers or rolls is or are movable by a motorized drive. This makes an automatic adjustment possible. This automatic adjustment between the small projection area and the large projection area may for example be coupled to the position of the driver's seat, so that, if the driver's seat moves into the rest position, the variation of the projection area also automatically takes place. Alternatively, it is also conceivable that the change in the size of the projection area is only initiated after actuation of a corresponding operating element, for example a button or a keypad or the like.

In any event, at least one motor, which actively moves the one roller, or both rollers if both rollers are coupled, serves for moving the projection area, it being possible for both the roller or roll rotation and the axial displacement to be controlled. Alternatively, each roller or roll may also be driven by a separate motor, the motors of course being correspondingly synchronized.

As an alternative to the axial movement of the projection area for changing its distance from the projector, it is conceivable that the projection area is installed in a fixed position and that one or more paneling elements that cover it in portions at the front and are movable for changing the degree of coverage are provided. In the case of this configuration, the projection area is consequently installed in a fixed state. The region of the projection area that is visible from the driver's side is defined by way of the position of corresponding paneling elements that cover the projection area at the edges and are movable. In an extended position of the paneling elements, the projection area is correspondingly covered at the edges; the visible part is smaller, compared with the situation when the paneling elements are retracted. In this way, therefore, the visible part of the projection area is changed, the projection area being visible is a larger area the further the driver or the driver's seat is away from the display device. At the same time, in the case of this alternative, a changing of the size of the image projection is brought about by the projector onto the projection area, that is to say that the representation of information can be switched over between small and large by the projector. If the paneling elements are extended, that is to say the visible part of the projection area is small, the size of the representation of the information, as it is projected by the projector onto the rear side of the small projection area, is also correspondingly small. If the paneling elements are retracted, the visible projection area is therefore correspondingly great, a changeover is also brought about by the projector and the representation of information is correspondingly adapted in size, that is to say that a kind of zoom is set by the projector.

The paneling element or elements may in this case be designed in the manner of panels of blinds and be movable by a motorized drive. The paneling elements are for example only provided at the upper edge and at the lower edge; they can therefore be moved upward and downward in relation to the projection area. For adjusting, a corresponding motor is provided, it being possible for the two paneling elements also to be moved in a coupled manner by way of the one motor. Is also conceivable, however, to provide additional lateral paneling elements, which can therefore be moved horizontally to the side in order to be able to vary the projection area also in its lateral size. For this purpose, a separate motor may be provided, and all of the paneling elements, in this case four, may be moved by way of one motor, with the movements coupled.

An expedient configuration of this second variant provides in this case that, in dependence on the changing of the size of the projection area, the size of the representation of information projected by the projector is also variable. Accordingly, the projector does not just switch over between a small representation of information and a large representation of information, but rather the actual size of the projection is almost infinitely variable, depending on how the changing of the size of the projection area takes place.

BRIEF DESCRIPTION OF THE DRAWINGS

Further advantages and details will become more apparent and more readily appreciated from the following description of the exemplary embodiments described below and also on the basis of the drawings, in which.

DETAILED DESCRIPTION OF THE PREFERRED EMBODIMENT

Figure 1:
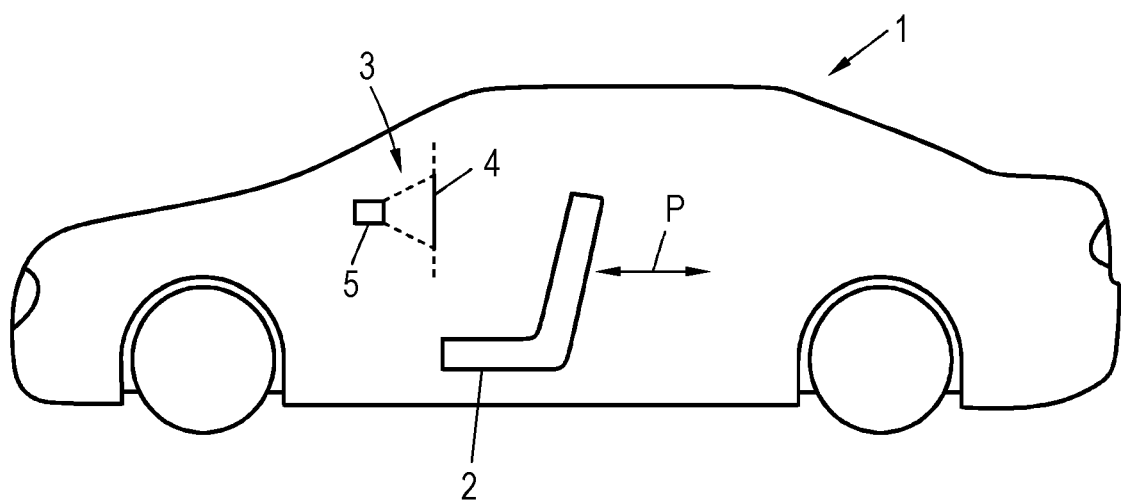
FIG. 1 is a simplified schematic representation of a motor vehicle.

Reference will now be made in detail to the preferred embodiments, examples of which are illustrated in the accompanying drawings, wherein like reference numerals refer to like elements throughout.

FIG. 1 shows a motor vehicle 1 having a driver's seat 2, which can be displaced axially, that is to say in the longitudinal direction of the vehicle, as represented by the double-headed arrow P. Depending on the position of the seat, the position of the driver (not shown) changes in relation to a display device 3 or a projection area 4 of the display device 3. As represented by dashed lines in FIG. 1, the size of the projection area 4 is variable, so that a representation of information that is depicted by a projector 5, which projects the representation of information onto the projection area 4 from the rear side, and is visible on the front side of the projection area 4, can be changed in its size.

Figure 2:
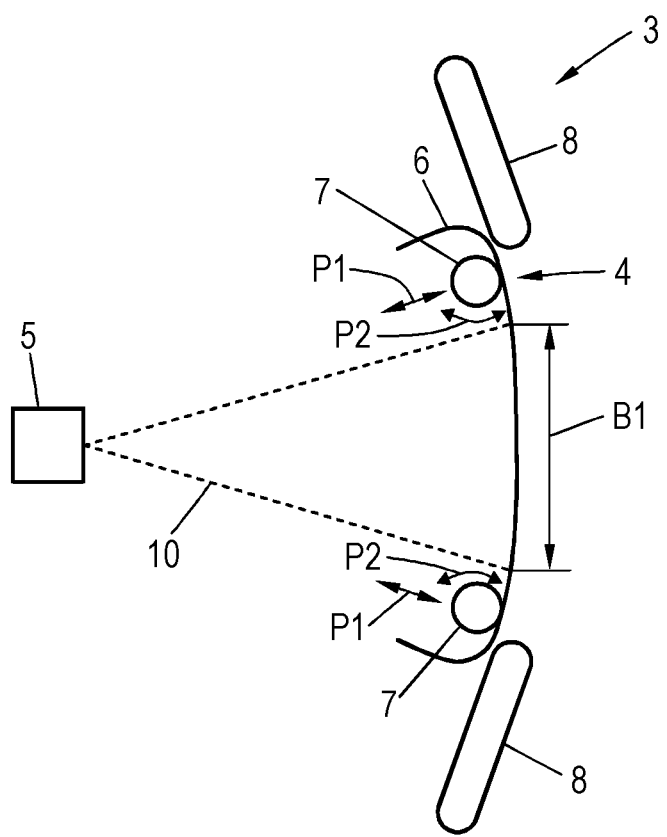
FIG. 2 is a schematic representation of a first embodiment with a movable projection area in a first position.

FIG. 2 shows a first embodiment of the display device 3. Shown is the projection area 4, which is provided here in the form of a flexible screen 6. The screen 6 is partially wound up on two rollers 7, these rollers being on the one hand linearly movable, but on the other hand also rotationally movable, as represented by the respective double-headed arrows P1 and P2. A motorized drive may be respectively provided for the movement, it also being possible however for the two rollers 7 to be coupled to one another both with regard to the linear movement and with regard to the rotational movement, so that only one common motor is required.

In the position shown in FIG. 2, the rollers 7 are as it were located behind corresponding paneling parts 8, for example in the region of the central console or the dashboard. The representation of information projected by the projector 5 onto the rear side of the screen 6 or the projection area 4, that is to say the projection 10, has a correspondingly small image size B1, as shown in FIG. 2. This is so because the screen 6 is still partially wound up on both rollers 7 on account of the retracted roller system.

Figure 3:
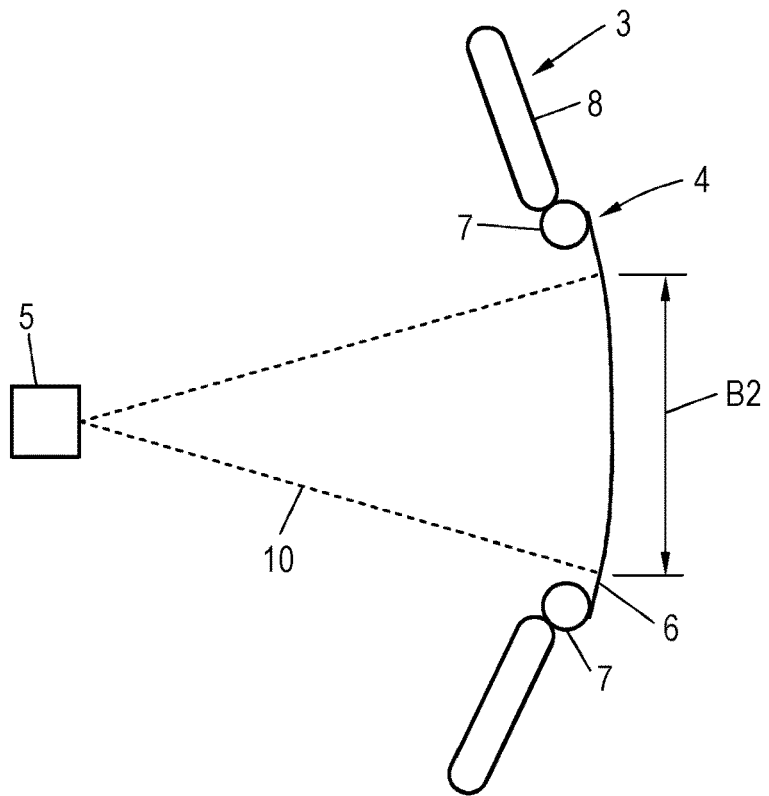
FIG. 3 is a schematic representation of the first embodiment illustrated in FIG. 2 with the projection area in a second position.

FIG. 3 shows the display device 3 from FIG. 2, the roller system being axially extended, and therefore the projection area 4 being at a distance axially further away from the projector 5 than in the position shown in FIG. 2. For this purpose, the two rollers 7 have been moved linearly in a way corresponding to the arrows P1 and at the same time rotated in a way corresponding to the arrows P2, so that the screen 6 is unwound from them. On account of the linear movement, the two rollers 7 are pushed out somewhat from the paneling elements 8, and similarly the screen 6. As can be seen, the size of the representation of the image changes, as indicated in FIG. 3 by B2. This means that consequently, on account of the increase in size of the projection area, at the same time the image representation area or the image size of the projected image is also increased in size.

The arrangement shown in FIG. 2 is set when the driver seat 2 is close to the display device 3, for example whenever the driver is himself actively driving. The arrangement shown in FIG. 3 is set when, in the case of partially or fully autonomous driving, the driver has brought the driver's seat 2 into a rest position, in which it is at a distance significantly further away from the display device 3. As a result of the image representation of increased size, it is also possible for him in this position to be able to perceive well the items of information projected onto it.

It is in this case conceivable to couple the adjustment from small to large image representation or the changing of the projection area to the usually automatically performed adjustment of the driver's seat 2. If, in the case of partially or fully autonomous driving, the seat is moved by the driver into the moved-back rest position, for example by actuating a corresponding operating button or the like, a switching over of the size of the projection area also takes place automatically, and vice versa.

Figure 4:
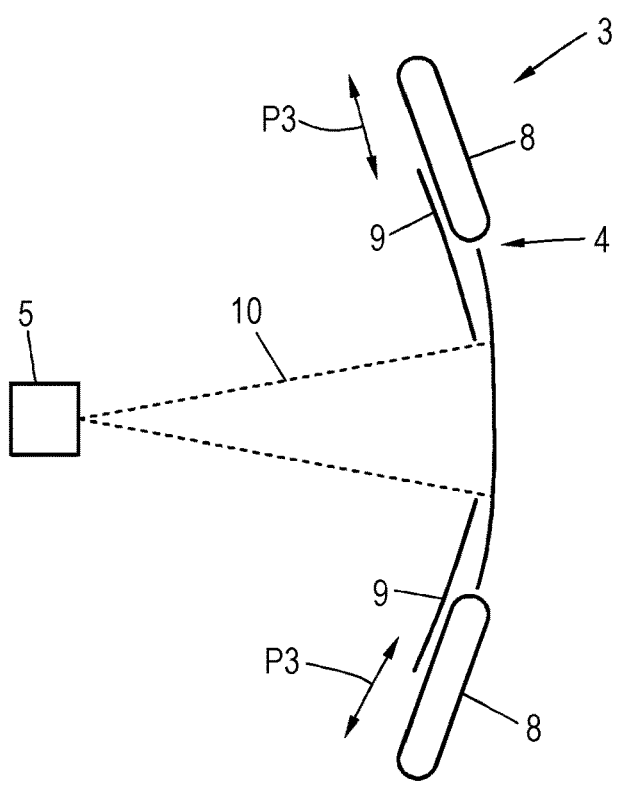
FIG. 4 is a schematic representation of a second embodiment with the projection area installed in a fixed state and assigned paneling elements in a first position.

FIG. 4 shows a second configuration of a display device 3, which shows a possibility for increasing the size of the projection area. Shown once again is the projection area 4, which here however are installed in a fixed state within the paneling parts 8. Here, the projection area 4 is assigned paneling elements 9 arranged above and below, which are movable upward and downward, as shown by the double-headed arrows P3. In the case of the arrangement according to FIG. 3, the paneling elements 9 are positioned such that they cover the projection area 4 at the top and at the bottom. The area onto which the projector 5 can project its representation of information, that is to say the projection area 4, is small, as a result of the partial coverage. This arrangement of the paneling elements 9, for example panel-like or blind-like paneling elements, is set when the driver's seat is alongside the display device 3.

If the driver's seat is moved into the rest position, the two paneling elements 9 are displaced by way of a corresponding motor and are moved further apart, so that the coverage of the projection area 4 decreases. Here, too, the two paneling elements 9 may be coupled in terms of movement, so that they can be moved by a common motor.

Figure 5:
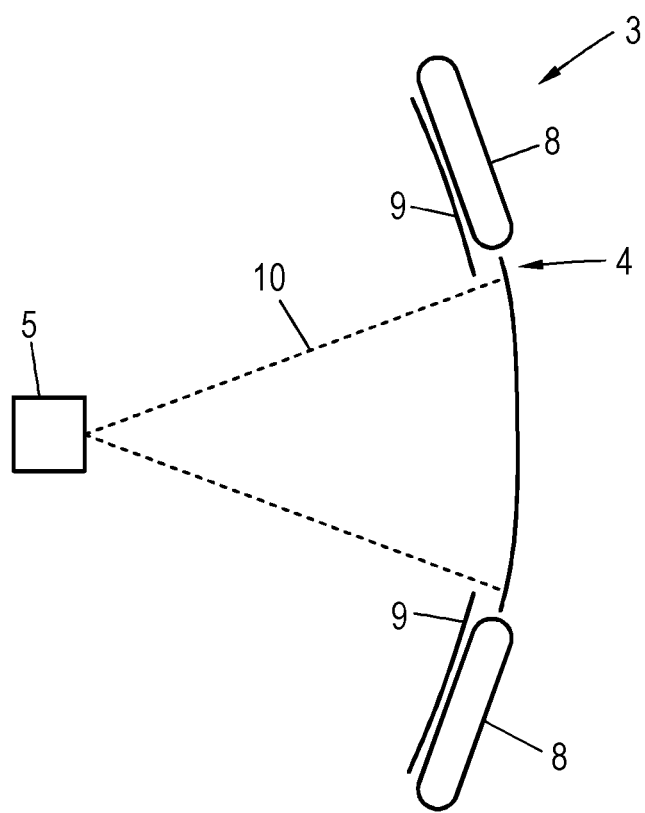
FIG. 5 is a schematic representation of the second embodiment illustrated in FIG. 4 with the paneling elements in a second position.

Increasing the size of the projection area 4 is accompanied by switching over of the projector 5 to the extent that it increases the size of the projection of the image representation, as shown in FIG. 5 in comparison with FIG. 4. The respective projection 10 is shown by dashed lines, in a way similar to in FIGS. 2 and 3. It is accordingly evident that the image visible on the front side of the projection area 4 is significantly larger, since the projection area 4 has been increased in size. If the seat is moved back again, the paneling elements 9 move together again; in a way similar to in the case of the exemplary embodiment according to FIGS. 2 and 3, the rollers 7 are retracted again into the paneling.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A motor vehicle comprising:
   a chassis;
   at least one display device, including
      at least one roller or roll;
      a projection screen, formed of flexible solid material, having a front side and a rear side and configured to be partially wound up and unwound on the at least one roller or roll, thereby providing a projection area variable in size,
      a projector configured to project a representation of information, visible from the front side of the projection screen, directly onto the rear side of the projection screen, an axial distance between the projection screen and the projector being variable; and
      at least one movable paneling element on the front side of the projection screen providing a variable degree of coverage of the projection screen; and
   a housing substantially surrounding the projection screen when in a first position, partially wound up, the projection screen having a second position unwound further from the housing than when in the first position.

2. The motor vehicle according to claim 1, wherein, in dependence on changes in the size of the projection area, the representation of information projected by the projector is variable by varying the axial distance as measured along a straight line from the projector to the projection screen.

3. The motor vehicle according to claim 1, wherein the axial distance is measured along a straight line from the projector to the projection screen.

4. The motor vehicle according to claim 1, wherein light from the projector is unreflected upon reaching the rear side of the projection screen.

* * * * *